May 12, 1931.  P. L. IRWIN  1,804,621
TORSION TESTING MACHINE
Filed Feb. 20, 1929
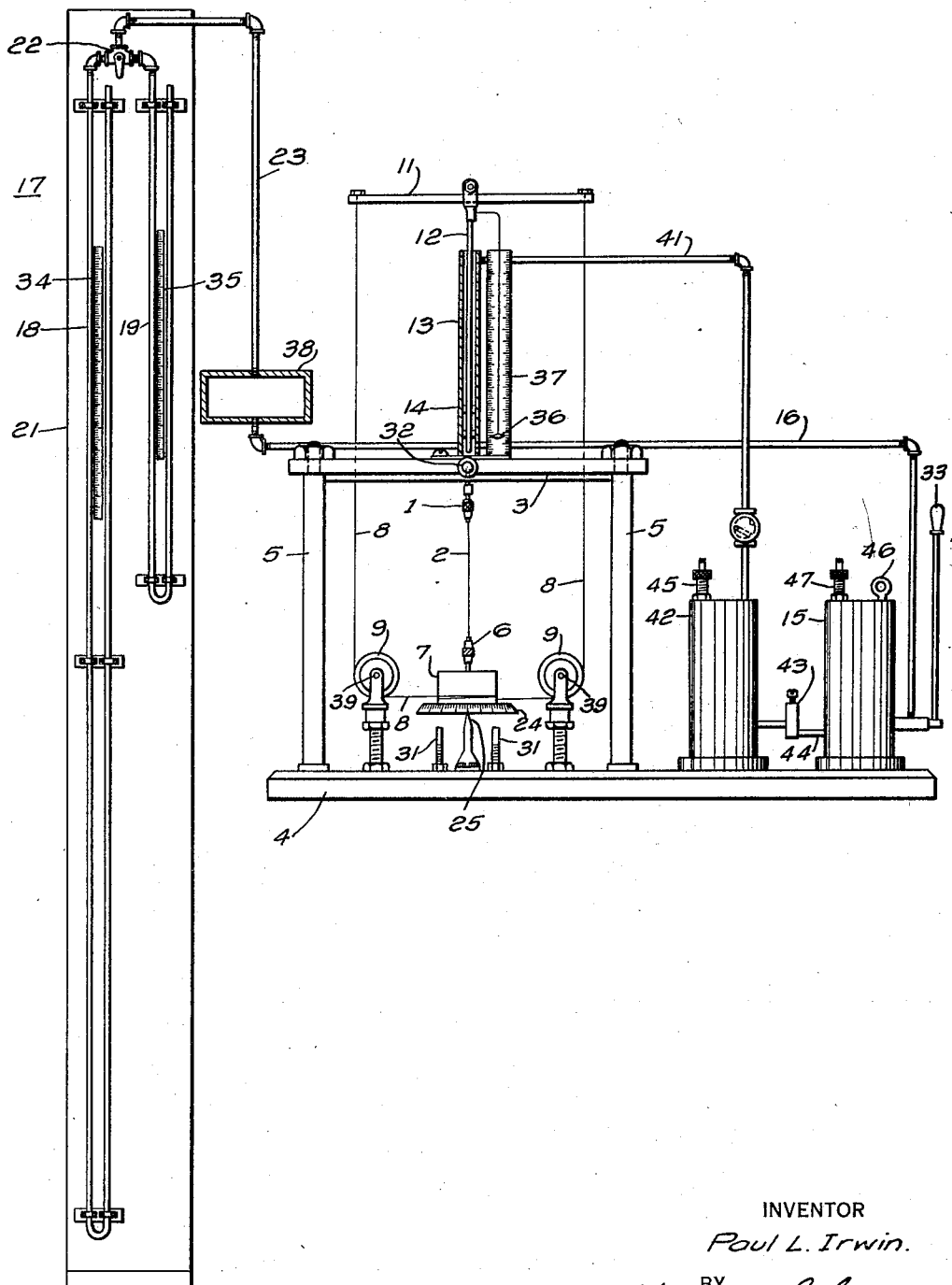
INVENTOR
Paul L. Irwin.
BY
ATTORNEY Patented May 12, 1931

1,804,621

UNITED STATES PATENT OFFICE

PAUL L. IRWIN, OF PITTSBURGH, PENNSYLVANIA

TORSION TESTING MACHINE

Application filed February 20, 1929. Serial No. 341,306.

My invention relates generally to testing machines and particularly to machines for determining the physical characteristics of materials.

It is an object of my invention to provide testing equipment for determining the physical characteristics of material when subjected to torsional stresses.

A more specific object of my invention is to provide a testing machine that is especially adapted for measuring the elastic characteristics in torsion of small and delicate specimens of the materials to be tested.

In the construction of certain delicate instruments and other apparatus, coil springs made by twisting very fine wire into the shape of a helix are utilized. Inasmuch as exactness is of primary importance in such apparatus, it is desirable that the coils and other parts be made of material the torsional characteristics of which have been determined with great accuracy. Heretofore, no means has been provided to measure the torsional characteristics of the very fine wires utilized in the coils of many types of springs and it is the purpose of this invention to provide for testing the smaller wires.

Heretofore, the machines of the prior art for conducting these tests have been designed with a view to testing specimens of materials larger in size than the wire it is intended to utilize. Therefore, if a standard machine were utilized for testing fine wire, the inherent frictional forces and errors in the machine would be so large in proportion to the forces exerted upon the test piece that the results would be inaccurate and of no value.

Furthermore, if a machine were to be constructed in accordance with the designs of the prior art, but upon a much smaller scale, the proportions between the size of the parts, the strength of the various members and their mass would be so changed that, reasoning in accordance with the well-known theory of models, the design would be entirely unsuitable for the purpose of testing delicate wires.

By means of my present invention, I have provided a testing machine of an entirely new type, which is especially suitable for testing delicate specimens of materials such as fine wire in torsion.

In the particular embodiment of my invention which is described in the following specification, I have provided means for exerting torsional forces upon a specimen to be tested, which act upon the specimen through a transmission mechanism that is substantially free from frictional resistance or other external influences. Means for accurately measuring the comparatively small forces which are exerted, and means for measuring the angular deflection of a test piece are provided to furnish the data from which the physical properties in torsion of the specimen being tested may be determined.

The foregoing and other objects and advantages of my invention may be readily appreciated upon studying the particular embodiment of the invention which is described in the following specification and shown in the accompanying drawing, in which the single figure is a view in elevation of a testing machine for testing small specimens in torsion.

As shown, the testing machine comprises an upper grip member 1, for supporting a specimen 2, that is carried by and depends from a horizontal cross member 3, which is supported upon a base 4 by means of two columns or supporting members 5. The specimen 2, which may be a very fine wire or similar article to be tested, may be stressed in torsion by forces which are applied to it by means of a movable lower gripping member 6, and to prevent the disturbing action of extraneous forces such as frictional forces, the lower gripping member 6 is suspended entirely from the test specimen 2.

In order that a force couple may be exerted on the specimen 2, the lower gripping member 6 is provided with a cylindrical-shaped drum 7 of bakelite or other suitable light material upon which two silk cords 8 or other flexible members are wrapped in opposite directions. As shown, the cords 8 extend in substantially a horizontal direction from the drum 7 to guide pulleys 9 that are disposed substantially in a vertical plane which includes the test specimen 2.

A torsional stress may be applied to the specimen 2, by exerting equal forces on the silk cords 8 which will exert a true mechanical couple on the drum 7 without imposing upon the member under test any undesirable horizontal or vertical force components.

For applying equal forces to the cords 8, an equalizing bar 11 is provided at the top of the testing device, to the ends of which the cords 8 are connected and they extend in a substantially vertical direction from the respective pulleys 9. The equalizing bar 11 is pivotally mounted at its center on the upper end of a piston rod 12 which extends from a cylinder 13 that is mounted on top of the horizontal cross member 3.

In order that the force which is exerted upon the equalizing bar 11 and thence transmitted by the cords 8 to the test piece 2 may be accurately controlled and measured, a hydraulic system is provided which is disposed to exert pressure on a piston 14 that is connected to the lower end of the piston rod 12 within the cylinder 13. Fluid pressure is supplied to the cylinder 13 from a pressure tank 15, mounted on the base 4, by means of a pipe 16 which leads from the lower portion of the pressure tank 15 to the bottom of the cylinder 13. The pressure tank 15 is normally maintained about half full of a comparatively light liquid such as Breth oil, the remainder of the tank being utilized for the storage of compressed air.

Inasmuch as the torque being applied to the specimen 2 being tested is directly proportional to the pressure exerted upon the piston 14, means comprising a U tube or manometer tube measuring device 17 is provided for accurately measuring the fluid pressure within the cylinder 13. The pressure measuring device 17 comprises two U tubes 18 and 19, respectively, that are mounted in the usual manner upon a vertically disposed standard or base 21. Each of the U tubes 18 and 19 is connected to a three-way valve 22 which is disposed to place either U tube in communication with a pipe 23 which leads to the lower portion of the cylinder 13. The longer U tube 18 is normally partially filled with water or other comparatively light liquid and is utilized for measuring low fluid pressure such as might obtain in testing very delicate specimens. The other shorter U tube 19 is ordinarily partially filled with mercury to constitute a standard mercury manometer tube for measuring pressures of a higher order.

For the purpose of measuring the angular deflection of the test specimen 2, the drum 7 is provided, at its lower edge, with a scale 24 that is disposed to cooperate with a pointer 25 that is mounted on the base 4.

The process of testing a particular specimen is carried out by first disposing the lower gripping member 6 and the drum 7, which is connected to it, on three supporting pins 31 which are mounted on the base 4, and which serve to support the grip 6 directly below its normal operating position. The specimen 2 to be tested may then be inserted and engaged by both the upper and lower gripping members 1 and 6, respectively.

The upper gripping member 1 is provided with a cylindrical shank or stem which extends vertically through the horizontal cross member 3 and which may be locked in position by means of a horizontally disposed set screw or locking screw 32.

In order to engage the test piece, the gripping member 1 may be positioned by loosening the locking screw 32 and lowering it the required distance then locking it again by the screw 32.

After the test piece has been engaged, the upper gripping member 1 may be released from the horizontal cross member 3 by loosening the locking screw 32 and moved upwardly to such an extent that the drum 7 is lifted from the supporting pins 3 and is suspended from the test specimen 2 in such position that the cords 8 extend from it in a substantially horizontal plane. The upper gripping member 1 may then be locked in its operating position by tightening the locking screw 32.

When the apparatus is so adjusted, it is clear from the description of the force transmission mechanism given hereinbefore, that the only forces which are ordinarily exerted upon the test piece 2 are the force necessary to support the weight of the gripping member 6 and the drum 7 and the force couple which is applied to the drum 7 by the cords 8. The proper U tube 18 or 19 is then selected and connected to the pipe 23 by suitably positioning the three-way valve 22.

Torque may now be applied to the specimen 2 under test by admitting fluid pressure to the cylinder 13 from the pressure tank 15 through a control needle valve that is disposed in the pipe 16 and that may be operated by means of a lever 33. Ordinarily, the control lever 33 is so adjusted that fluid is admitted quite slowly and as the torque is applied to the test specimen, simultaneous readings are taken of the deflection as indicated on the scale 24 and of the pressure in the cylinder 13, as shown by scales 34 and 35 that are slidingly mounted relative to the U tubes 18 and 19, respectively, in the usual manner employed for accurately measuring fluid pressures.

In order that the pressure being exerted upon the piston 14 may be accurately known, readings are also taken of the position of the piston 14 as shown by a pointer 36 that is disposed adjacent to a scale 37 at the side of the cylinder 13. The static pressure of the column of liquid within the cylinder 13, as determined by the reading on the scale 37, may then be subtracted from the total pressure indicated by the U tube measuring device 17, in order to determine the resulting pressure acting upon the bottom of the piston 14.

To maintain the static pressure of the column of liquid in the pipe 23 substantially constant, a chamber 38, of relatively large cross-sectional area, is provided. When pressure is applied to the cylinder 13 such liquid as may flow into the chamber 38 will not increase the depth of the liquid therein to an appreciable amount, hence the static pressure may be considered constant.

As a further precaution to insure that the torque exerted upon the specimen 2 being tested will be accurately measured, the frictional forces within the force transmission system are reduced to a minimum by mounting the guide pulleys 9 upon jewelled bearings 39 and by providing a clearance space between the piston 14 and the wall of the cylinder 13 through which a small amount of the fluid within the cylinder 13 may pass during the testing operation. By reason of this clearance space, the piston 14 is caused to float on a moving film of oil which prevents static frictional conditions from obtaining between the piston 14 and the wall of the cylinder 13.

The small amount of oil which passes the piston 14 through the clearance space during a test is carried to the top of the cylinder 13 by the piston 14 and is conducted by an overflow pipe 41 to a collecting tank 42 which is mounted on the base 4 adjacent to the pressure tank 15. After the testing machine has been in operation for some time, the accumulated leakage fluid may be returned to the tank 15 by opening a valve 43, which is disposed in a pipe 44 that connects the lower portions of the two tanks and by then applying air pressure to the tank 42 through a valve 45 which may be similar to the ordinary automobile tire valve. If it is necessary to add fluid to the system at any time, a plug 46 may be removed from a hole in the top of the pressure tank 15 to permit the necessary liquid to be introduced. After the plug 46 has again been tightly secured in the hole in the pressure tank 15, air pressure for operating the testing machine may be applied through a valve 47 which is similar to the valve 45 on the collecting tank 42.

From the foregoing explanation of the operation of the testing machine it is clear that, by my invention, I have provided a device for accurately measuring the elastic properties of delicate specimens such as fine wire, when subjected to torsional stresses. As set forth in the foregoing description, the extraneous forces, such as frictional forces which may introduce errors, have been reduced to a minimum and accurate means have been provided for measuring the comparatively small torque exerted upon the piece being tested and for measuring its deflection.

Although I have described a specific embodiment of the invention, it will be obvious to those skilled in the art relating to testing machines that various modifications may be made in the general arrangement and the details of the various elements of the device without departing from the spirit and the scope of the invention.

I claim as my invention:

1. In a device for measuring the torsional characteristics of wires, in combination, stationary means for holding one end of the specimen, movable means for holding and exerting torque on the other end of the specimen, hydraulic means for actuating the movable holding means, and pneumatic means for measuring the torque exerted by the holding means.

2. In a device for testing fine wire in torsion, in combination, grips for holding the wire to be tested; hydraulic pressure means for applying a force couple to the grips for holding the wire, and a manometer tube for measuring the hydraulic pressure whereby the torsional stress within the wire may be determined.

3. In a testing machine for testing specimens in torsion, a frame member, grip members for securing the test specimen carried by the frame member, hydraulic means for exerting a torsional force upon the specimen, means for measuring the torsional force exerted upon the specimen, and means for measuring the angular deflection of the specimen.

4. In a machine for testing specimens, a frame member, a grip member depending from the frame member for supporting a specimen to be tested, a second grip member disposed to be suspended from the test specimen, means for applying torque to the second grip member for testing the specimen in torsion, means for measuring the applied torque, and means for measuring the angular deflection of the test specimen.

5. In a device for testing wire, a stationary grip for supporting the wire to be tested, a movable grip supported by the wire to be tested, means for exerting a force couple on the movable grip for applying torque to the wire, means for measuring the torque exerted by the force couple on the wire, and means for measuring the angular deflection of the wire to determine its physical characteristics under torsional loads.

6. A device for determining the physical characteristics of specimens of material in torsion that comprises a stationary grip member for securing one end of the specimen of material, a movable grip member for securing the other end of the specimen, and means for impressing torsional force on the movable grip member, said means comprising a drum fastened to the grip member, a flexible member wrapped around the drum, means for applying force to the flexible member, means for measuring the force, and means for measuring the angular deflection of the material being tested.

7. A device for testing specimens of material in torsion that comprises a frame, a stationary grip member carried by the frame for securing one end of the specimen of material to be tested, a movable grip member disposed to be supported by the material being tested, a drum fastened to the movable grip member, two flexible members wrapped around the drum, and means for applying force to the flexible members to rotate the drum and the grip member.

8. A device for testing specimens of material in torsion that comprises a frame, a stationary grip member carried by the frame for securing one end of the specimen of material to be tested, a movable grip member disposed to be supported by the material being tested, a drum fastened to the movable grip member, two flexible members wrapped around the drum, means for applying force to the flexible members to rotate the drum and the grip member, an equalizing device for exerting equal tension forces on the flexible members, a cylinder having a piston for exerting force on the equalizing device, means for measuring the pressure in the cylinder to determine the torque being exerted, and means for measuring the deflection of the material being tested.

9. In a device for testing a specimen of material in torsion, in combination, stationary means for holding one end of the specimen, movable means for holding and exerting torque on the other end of the specimen, and fluid-pressure means for actuating the movable holding means.

10. In a torsion tester for wires, in combination, means for suspending a wire to be tested in torsion with one end stationary and the other end free to receive a torsional force, means for applying a torsional force to the free end, means for measuring the angular movement of the free end of the wire, and means for measuring the applied torsional force.

In testimony whereof, I have hereunto subscribed my name this 15th day of February, 1929.

PAUL L. IRWIN.